(12) United States Patent
Kawate et al.

(10) Patent No.: US 11,581,544 B2
(45) Date of Patent: Feb. 14, 2023

(54) ENERGY STORAGE DEVICE AND ENERGY STORAGE DEVICE PRODUCTION METHOD

(71) Applicants: GS Yuasa International Ltd., Kyoto (JP); Robert Bosch GmbH, Stuttgart (DE)

(72) Inventors: Kenji Kawate, Kyoto (JP); Takeshi Kawahara, Ritto (JP); Tomoko Nishikawa, Ritto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 751 days.

(21) Appl. No.: 15/760,880

(22) PCT Filed: Sep. 16, 2016

(86) PCT No.: PCT/JP2016/077544
§ 371 (c)(1),
(2) Date: Mar. 16, 2018

(87) PCT Pub. No.: WO2017/047789
PCT Pub. Date: Mar. 23, 2017

(65) Prior Publication Data
US 2018/0261849 A1 Sep. 13, 2018

(30) Foreign Application Priority Data
Sep. 18, 2015 (JP) .............................. JP2015-186094

(51) Int. Cl.
*H01M 4/64* (2006.01)
*H01G 11/84* (2013.01)
(Continued)

(52) U.S. Cl.
CPC .............. *H01M 4/64* (2013.01); *H01G 11/74* (2013.01); *H01G 11/76* (2013.01); *H01G 11/82* (2013.01);
(Continued)

(58) Field of Classification Search
None
See application file for complete search history.

(56) References Cited

U.S. PATENT DOCUMENTS

2006/0019158 A1 * 1/2006 Mori ....................... H01M 2/22
429/174
2011/0244285 A1 10/2011 Shinohara
(Continued)

FOREIGN PATENT DOCUMENTS

JP 2001-135299 A 5/2001
JP 2006-4729 A 1/2006
(Continued)

OTHER PUBLICATIONS

JP2001135299A Translation from Espacenet (Year: 2001).*
Extended European Search Report dated Apr. 4, 2019 for European Patent Application No. 16 846 660.5.

*Primary Examiner* — Nathanael T Zemui
(74) *Attorney, Agent, or Firm* — McGinn I.P. Law Group, PLLC.

(57) ABSTRACT

An energy storage device includes a current collector (negative electrode current collector), electrode body that includes a body portion and a tab projecting from the body portion, and a leading plate (negative electrode leading plate) that connects the current collector and the tab. In the leading plate, first and second plates and facing each other are continuously connected at end portions thereof in the first plate, the current collector is fixed to a first principal surface on the opposite side to the second plate. In the second plate, the tab is fixed to a second principal surface on the opposite side to the first plate.

20 Claims, 14 Drawing Sheets

(51) Int. Cl.
*H01G 11/74* (2013.01)
*H01G 11/82* (2013.01)
*H01G 11/76* (2013.01)
*H01M 50/403* (2021.01)
*H01M 50/531* (2021.01)
*H01G 11/78* (2013.01)

(52) U.S. Cl.
CPC .......... *H01G 11/84* (2013.01); *H01M 50/403* (2021.01); *H01M 50/531* (2021.01); *H01G 11/78* (2013.01)

(56) References Cited

U.S. PATENT DOCUMENTS

| | | |
|---|---|---|
| 2012/0189899 A1 | 7/2012 | Kanda et al. |
| 2013/0295430 A1* | 11/2013 | Kurahashi ............... H01M 2/22 |
| | | 429/120 |

FOREIGN PATENT DOCUMENTS

| | | |
|---|---|---|
| JP | 2006-032298 A | 2/2006 |
| JP | 2011-216398 A | 10/2011 |
| JP | 2013-161757 A | 8/2013 |

\* cited by examiner

ENERGY STORAGE DEVICE AND ENERGY STORAGE DEVICE PRODUCTION METHOD

TECHNICAL FIELD

The present invention relates to an energy storage device and an energy storage device production method.

BACKGROUND ART

Conventionally, there is well known an energy storage device in which a tab of an electrode body and a leading plate connected to a current collector are electrically connected to each other. For example, Patent Document 1 discloses a configuration in which the tab nipped by a protective leading plate is connected to the current collector to protect the tab.

PRIOR ART DOCUMENTS

Patent Documents

Patent Document 1: JP-A-2011-70918

SUMMARY OF THE INVENTION

Problems to be Solved by the Invention

However, in Patent Document 1, because the tab is deformed like a spring, plural portions bent into an R-shape are provided in the tab. Therefore, a space in which the tab is accommodated becomes large, which leads to enlargement of the energy storage device. Because the tab is nipped by the protective leading plate, there is a risk that, when the tab swings, the tab is damaged by interfering with a leading portion of the protective leading plate.

An object of the present invention is to provide an energy storage device and a production method thereof, for being able to prevent the damage of the tab while the enlargement of the energy storage device is suppressed.

Means for Solving the Problems

To achieve the object, in accordance with one aspect of the present invention, an energy storage device includes: a current collector; an electrode body that includes a body portion and a tab projecting from the body portion; and a leading plate that connects the current collector and the tab. At this point, in the leading plate, first and second plates facing each other are continuously connected at end portions thereof, in the first plate, the current collector is fixed to a first principal surface on an opposite side to the second plate, and, in the second plate, the tab is fixed to a second principal surface on an opposite side to the first plate.

Advantages of the Invention

In the present invention, the breakage of the tab can be prevented while the enlargement of the energy storage device is suppressed.

MODE FOR CARRYING OUT THE INVENTION

Figure 1:
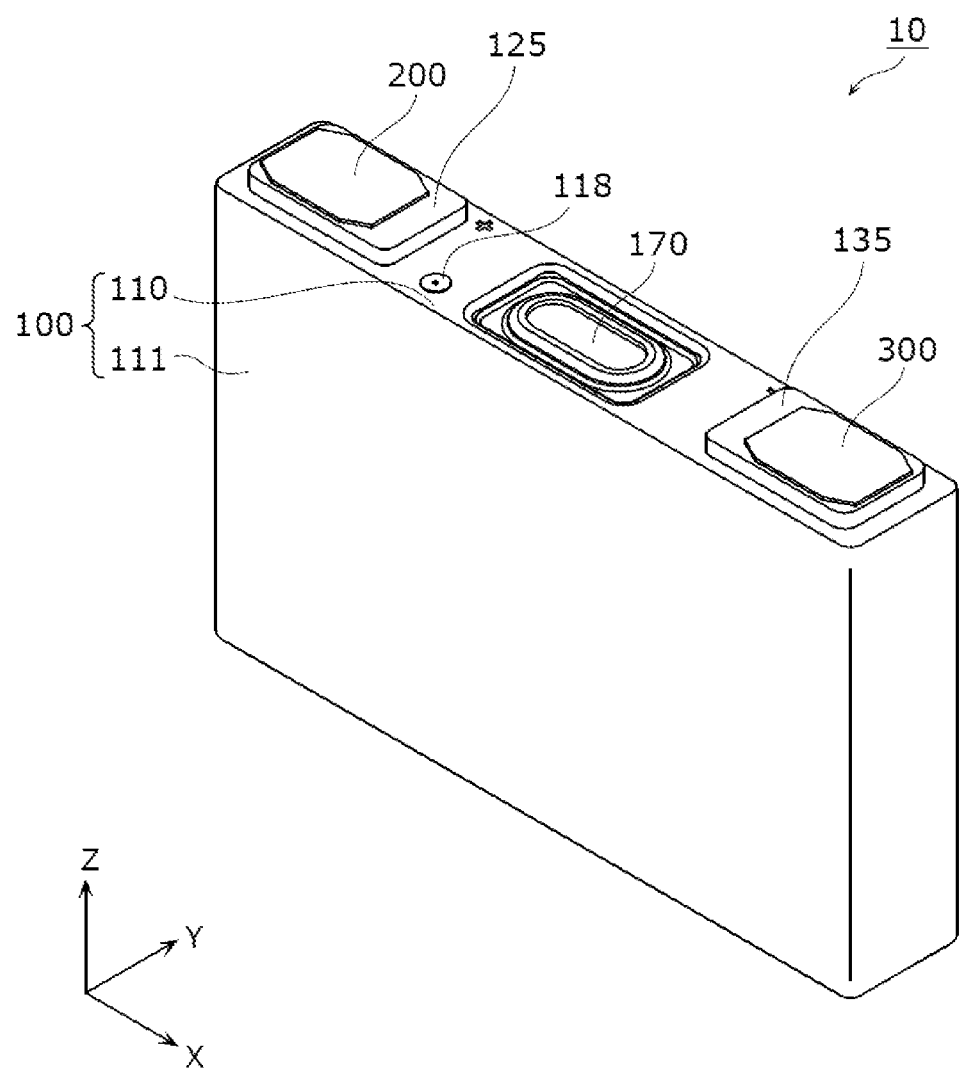
FIG. 1 is a perspective view illustrating an appearance of an energy storage device according to an embodiment.

To achieve the object, in accordance with one aspect of the present invention, an energy storage device includes: a current collector; an electrode body that includes a body portion and a tab projecting from the body portion; and a leading plate that connects the current collector and the tab. At this point, in the leading plate, first and second plates facing each other are continuously connected at end portions thereof, in the first plate, the current collector is fixed to a first principal surface on an opposite side to the second plate, and, in the second plate, the tab is fixed to a second principal surface on an opposite side to the first plate.

In the configuration, the first plate and second plate of the leading plate face each other, and the tab is fixed to the second principal surface of the second plate. That is, because the tab is fixed to the second principal surface constituting the outer peripheral surface of the leading plate, the tab hardly interferes with the leading end portion of the leading plate. Accordingly, the breakage of the tab can be suppressed.

When the breakage of the tab is suppressed, it is not necessary to bend the plural tabs into an R-shape, but the accommodation space of the tab can be reduced. Accordingly, enlargement of the energy storage device can be suppressed.

In the energy storage device, in the leading plate, the second principal surface of the second plate may be disposed at a position facing an end portion of the body portion from which the tab projects.

In the configuration, because the second principal surface of the second plate of the leading plate faces the end portion from which the tab of the body portion projects, the second plate and the first plate overlap the end portion of the body portion. Accordingly, an accommodation space for the leading plate can be reduced.

In the energy storage device, an insulating member may be provided between the tab and the body portion.

In the configuration, because the insulating member is provided between the tab and the body portion, the insulating member presses the tab even if the tab is broken, and the tab can be prevented from coming into contact with other conductive members.

In accordance with another aspect of the present invention, a method for producing an energy storage device including: a current collector; an electrode body that includes a body portion and a tab projecting from the body portion; and a leading plate that includes first and second plates facing each other, the current collector being fixed to a first principal surface on an opposite side to the second plate in the first plate, the tab being fixed to a second principal surface on an opposite side to the first plate in the second plate, includes: fixing the tab to a second area of a flat plate, the flat plate including a first area and the second area on an identical flat surface, the first area constituting the first principal surface of the first plate, the second area constituting the second principal surface of the second plate; fixing the current collector to the first area; and forming the flat plate in the leading plate by bending an area between the first area and the second area.

In the configuration, the first plate and second plate of the leading plate face each other, and the tab is fixed to the second principal surface of the second plate. That is, because the tab is fixed to the second principal surface constituting the outer peripheral surface of the leading plate, the tab hardly interferes with the leading end portion of the leading plate. Accordingly, the breakage of the tab can be suppressed.

After the current collector and the tab are fixed to the identical flat surface of the flat plate, the flat plate is bent to constitute the leading plate, so that the fixing can be performed more easily than the case that the fixing is performed on the originally-bent member. The current collector and the tab are fixed to the flat plate, so that the stable fixing can be performed and joining strength of the tab can be enhanced. Accordingly, breakage of the tab can be suppressed.

Hereinafter, an energy storage device according to an exemplary embodiment of the present invention will be described with reference to the drawings. Each drawing is a schematic diagram, but not always strict.

The following embodiment illustrates one specific example of the present invention. A shape, a material, a component, disposition position and connection form of the component, and a procedure of production processes in the embodiment are illustrated only by way of example, but do not restrict the present invention. In the components of the embodiment, the component that is not described in an independent claim indicating the highest concept is described as optional component.

An energy storage device 10 of the embodiment will generally be described with reference to FIGS. 1 to 3.

FIG. 1 is a perspective view illustrating an appearance of the energy storage device 10 of the embodiment. FIG. 2 is an exploded perspective view illustrating the energy storage device 10 of the embodiment. FIG. 3 is an exploded perspective view illustrating a cover plate structure 180 of the embodiment. In FIG. 3, broken lines indicate a positive electrode leading plate 145 and a negative electrode leading plate 155, and the positive electrode leading plate 145 and the negative electrode leading plate 155 are connected to a positive electrode current collector 140 and a negative electrode current collector 150, which are included in the cover plate structure 180.

In FIG. 1 and the drawings subsequent to FIG. 1, for convenience, the description is made while a Z-axis direction is set to a vertical direction. However, sometimes the Z-axis direction is not always matched with the vertical direction in an actual use mode.

The energy storage device 10 is a secondary battery that can charge and discharge electricity. Specifically, the energy storage device 10 is a nonaqueous electrolyte secondary battery such as a lithium ion secondary battery. For example, the energy storage device 10 is applied to an electric vehicle (EV), a hybrid electric vehicle (HEV), or a plug-in hybrid electric vehicle (PHEV). The energy storage device 10 is not limited to the nonaqueous electrolyte secondary battery, but may be a secondary battery except for the nonaqueous electrolyte secondary battery or a capacitor.

As illustrated in FIG. 1, the energy storage device 10 includes a container 100, a positive electrode terminal 200, and a negative electrode terminal 300. As illustrated in FIG. 2, an electrode body 400 is accommodated in the container 100, and the cover plate structure 180 is disposed above the electrode body 400.

The cover plate structure 180 includes a cover plate 110 of the container 100, the current collector, and the insulating member. Specifically, the cover plate structure 180 includes the plate-like positive electrode current collector 140 as the current collector. The positive electrode current collector 140 is electrically connected to a tab 410 on a positive electrode side of the electrode body 400. Similarly, the cover plate structure 180 includes the plate-like negative electrode current collector 150 as the current collector. The negative electrode current collector 150 is electrically connected to a tab 420 on a negative electrode side of the electrode body 400.

The cover plate structure 180 includes a lower insulating member 120 as the insulating member. The lower insulating member 120 is disposed between the cover plate 110 and the positive electrode current collector 140. Similarly, the cover plate structure 180 includes a lower insulating member 130 as the insulating member. The lower insulating member 130 is disposed between the cover plate 110 and the negative electrode current collector 150.

The cover plate structure 180 further includes the positive electrode terminal 200, the negative electrode terminal 300, an upper insulating member 125, and an upper insulating member 135.

The upper insulating member 125 is disposed between the cover plate 110 and the positive electrode terminal 200. The upper insulating member 135 is disposed between the cover plate 110 and the negative electrode terminal 300.

An upper spacer 500 and a buffer sheet 600 are disposed between the over plate structure 180 having the above configuration and the electrode body 400.

The upper spacer 500 is disposed between the side on which the tab 410 and 420 are provided and the cover plate 110 in the electrode body 400. The upper spacer 500 includes a latch 510 that is partially latched in the cover plate structure 180.

Specifically, the upper spacer 500 has a flat shape as a whole, and includes two latches 510 and two insertion portions 520 in which the tabs 410 and 420 are inserted (that the tab 410 and 420 pierce). In the embodiment, the insertion portion 520 is provided into a notch shape in the upper spacer 500. The upper spacer 500 is made of a material, such as polycarbonate (PC), polypropylene (PP), polyethylene (PE), and polyphenylene sulfide resin (PPS), which has an insulating property.

For example, the upper spacer 500 acts as a member that directly or indirectly controls upward movement (direction to the cover plate 110) of the electrode body 400, or a member that prevents a short circuit between the cover plate structure 180 and the electrode body 400. The upper spacer 500 includes the two latches 510, and each of the two latches 510 is latched in an attaching unit 122 or 132 included in the cover plate structure 180.

The buffer sheet 600 is made of a highly flexible, porous material such as foamed polyethylene, and acts as a buffer material between the electrode body 400 and the upper spacer 500.

In the embodiment, a side spacer 700 is disposed between a side surface (in the embodiment, both side surfaces in an X-axis direction) in a direction intersecting a direction (Z-axis direction) parallel to the electrode body 400 and cover plate 110 and an inner peripheral surface of the container 100 in the electrode body 400. For example, the side spacer 700 has a function of controlling a position of the electrode body 400. Similarly to the upper spacer 500, the side spacer 700 is made of the material, such as PC, PP, PE, or PPS, which has the insulating property.

Figure 2:
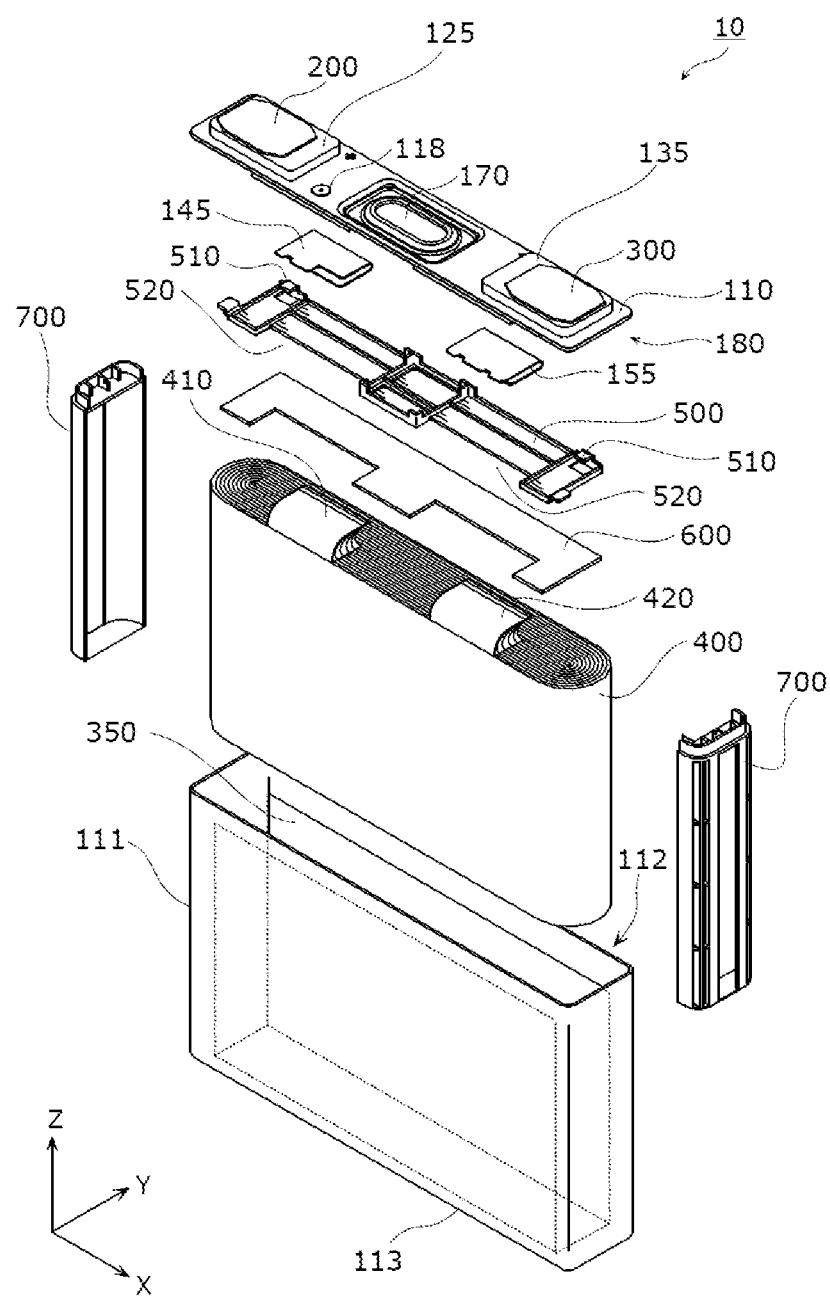
FIG. 2 is an exploded perspective view illustrating the energy storage device of the embodiment.
Figure 3:
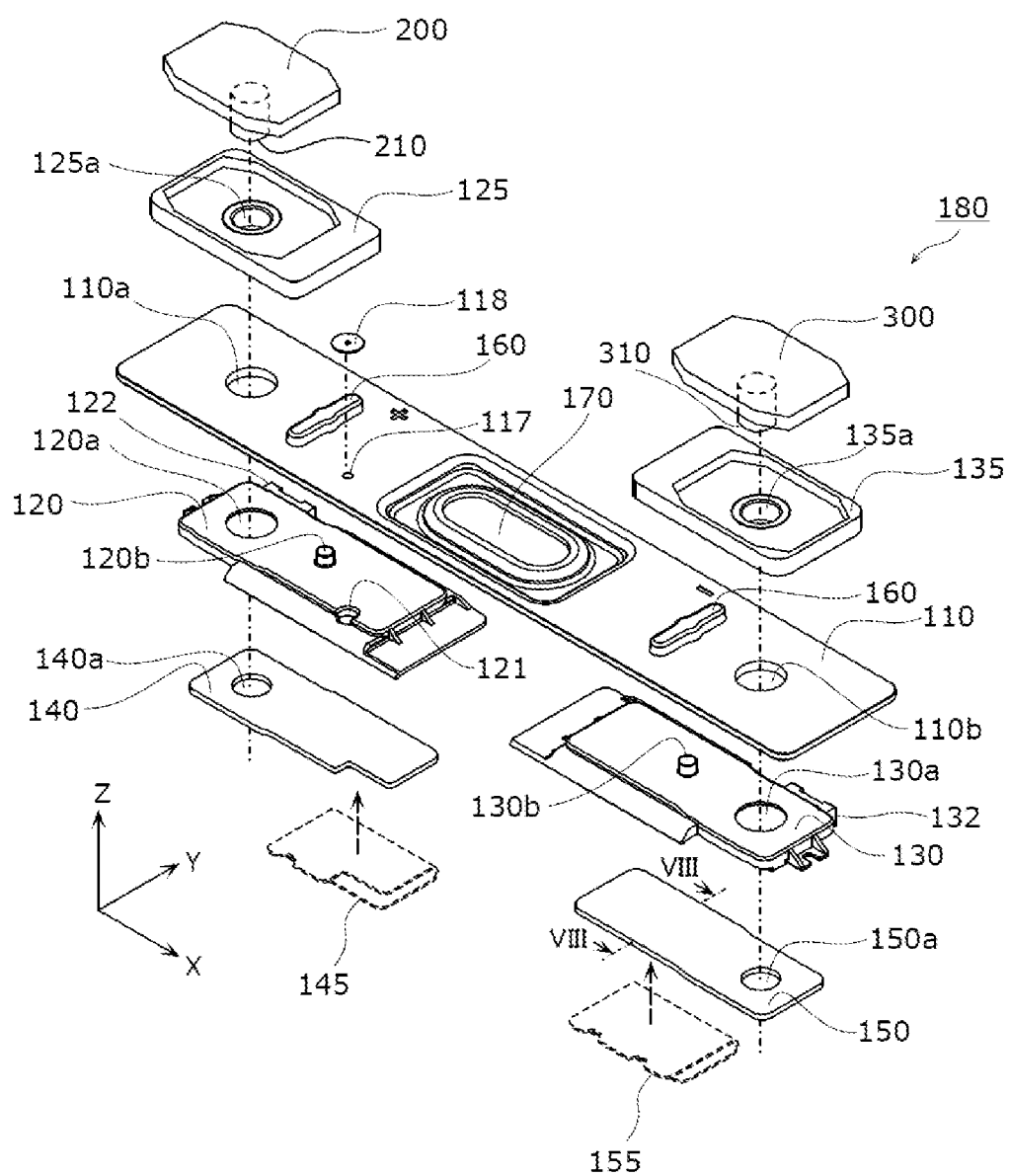
FIG. 3 is an exploded perspective view illustrating a cover plate structure of the embodiment.

In addition to the components in FIGS. 1 to 3, the energy storage device 10 may include another element, such as a buffer sheet disposed between the electrode body 400 and a bottom 113 of the container 100 (main body 111). Although an electrolyte solution (nonaqueous electrolyte) is sealed in the container 100 of the energy storage device 10, the electrolyte solution is not illustrated.

The container 100 includes the main body 111 and the cover plate 110. There is no particular limitation to a material for the main body 111 and the cover plate 110. For example, the main body 111 and the cover plate 110 are made of weldable metal such as stainless steel, aluminum, and aluminum alloy.

The main body 111 is formed into a tubular body having a rectangular shape in a plan view. The main body 111 includes an opening 112 in one end portion while including a bottom 113 in the other end portion. An insulating sheet 350 covering the electrode body 400 is provided in the main body 111. The insulating sheet 350 is made of the material, such as PC, PP, PE, or PPS, which has the insulating property. The insulating sheet 350 is placed on the inner peripheral surface of the main body 111, and located between the electrode body 400 and the main body 111. Specifically, when viewed from above, the insulating sheet 350 is disposed on a pair of inner peripheral surfaces of the main body 111 constituting a long side of the opening 112 and an inner surface of the bottom 113.

The cover plate 110 is welded after the electrode body 400, the insulating sheet 350, and the like are accommodated in the main body 111, whereby the inside of the main body 111 is sealed.

The cover plate 110 is a plate-like member that closes the opening 112 of the main body 111. As illustrated in FIGS. 2 and 3, a safety valve 170, an electrolyte solution filling port 117, through-holes 110a and 110b, and two swelling units 160 are formed in the cover plate 110. The safety valve 170 is opened when an inner pressure of the container 100 increases, whereby the safety valve 170 has a function of releasing gas in the container 100.

The electrolyte solution filling port 117 is a through-hole through which the electrolyte solution is poured in producing the energy storage device 10. As illustrated in FIGS. 1 to 3, an electrolyte solution filling plug 118 is disposed in the cover plate 110 in order to close the electrolyte solution filling port 117. That is, in producing the energy storage device 10, the electrolyte solution is poured into the container 100 from the electrolyte solution filling port 117, and the electrolyte solution filling plug 118 is welded to the cover plate 110 to close the electrolyte solution filling port 117, thereby accommodating the electrolyte solution in the container 100.

Any solution can be selected as the electrolyte solution sealed in the container 100 without restriction as long as the solution does not damage performance of the energy storage device 10.

In the embodiment, each of the two swelling units 160 is provided in the cover plate 110 by forming a part of the cover plate 110 into a swelling shape. For example, the two swelling units 160 are used to position the upper insulating member 125 or 135. A recess (not illustrated) that is concave upward is formed on a rear side (the side opposite to the electrode body 400) of the swelling unit 160, and an engagement projection 120b or 130b of the lower insulating member 120 or 130 engages a part of the recess. Therefore, the lower insulating member 120 or 130 is positioned, and fixed to the cover plate 110 at this point.

The upper insulating member 125 electrically insulates the positive electrode terminal 200 from the cover plate 110. The lower insulating member 120 electrically insulates the positive electrode current collector 140 from the cover plate 110. The upper insulating member 135 electrically insulates the negative electrode terminal 300 from the cover plate 110. The lower insulating member 130 electrically insulates the negative electrode current collector 150 from the cover plate 110. For example, sometimes the upper insulating members 125 and 135 are referred to as an upper gasket, and the lower insulating members 120 and 130 are referred to as a lower gasket. That is, in the embodiment, the upper insulating members 125 and 135 and the lower insulating members 120 and 130 have a function of sealing gaps between the electrode terminals (200 or 300) and the container 100.

Similarly to the upper spacer 500, the upper insulating members 125 and 135 and the lower insulating members 120 and 130 are made of the material, such as PC, PP, PE, or PPS, which has the insulating property. In the lower insulating member 120, a through-hole 121 guiding the electrolyte solution flowing from the electrolyte solution filling port 117 toward the electrode body 400 is made in a portion located immediately below the electrolyte solution filling port 117.

The lower gasket will be described in detail by taking the lower insulating member 130 for an example.

Figure 4:
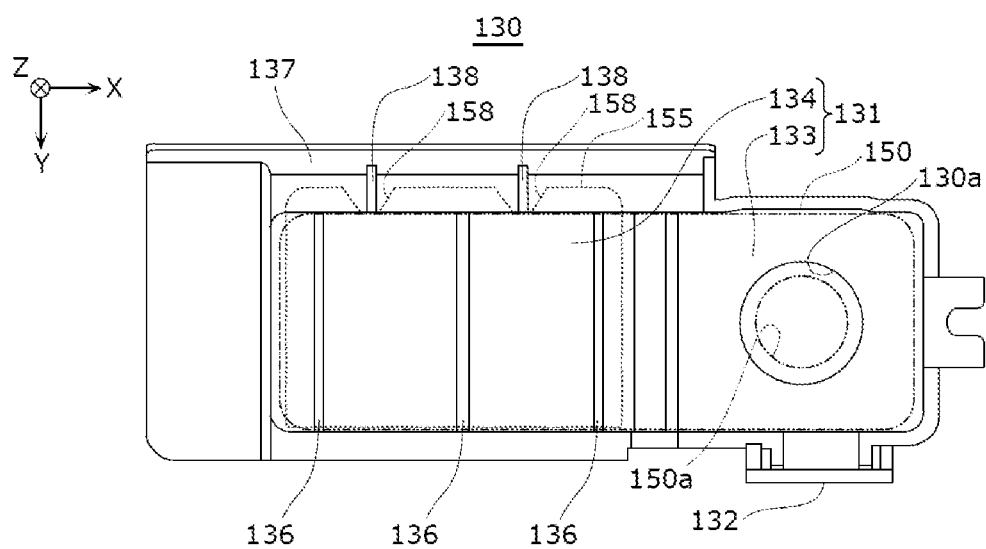
FIG. 4 is a plan view illustrating a schematic configuration of a lower insulating member of the embodiment.
Figure 5:
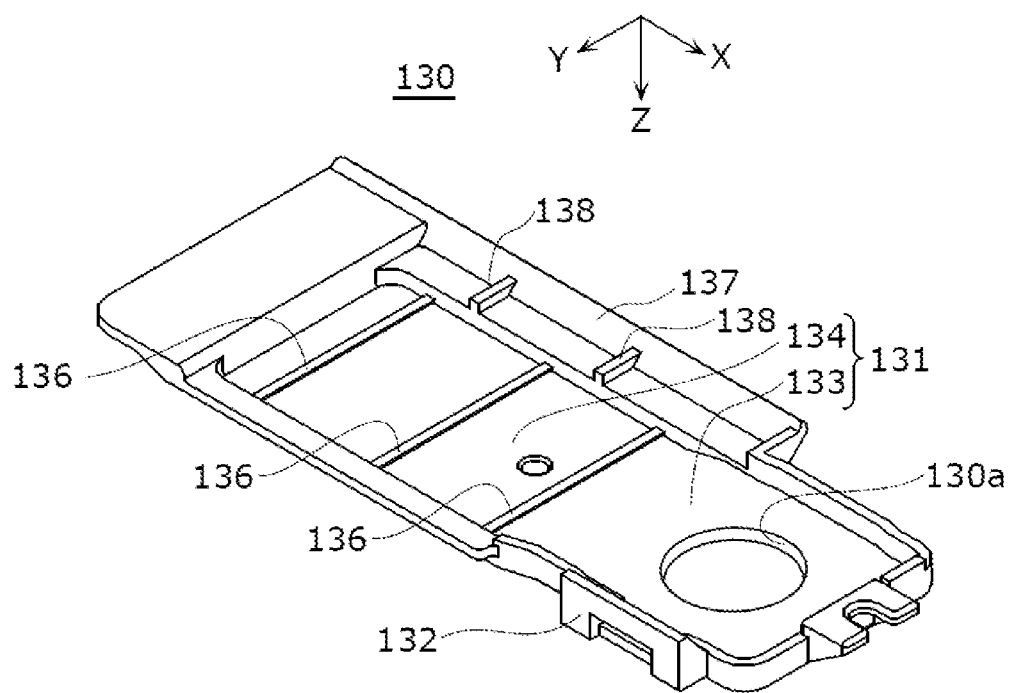
FIG. 5 is a perspective view illustrating the schematic configuration of the lower insulating member of the embodiment when the lower insulating member is viewed from below.

FIG. 4 is a plan view illustrating a schematic configuration of the lower insulating member 130 of the embodiment when the lower insulating member 130 is viewed from below. FIG. 5 is a perspective view illustrating the schematic configuration of the lower insulating member 130 of the embodiment when the lower insulating member 130 is viewed from below. In FIG. 4, an external shape of the negative electrode current collector 150 is indicated by an alternate long and two dashes line, and an external shape of the negative electrode leading plate 155 is indicated by a broken line.

Although the lower insulating member 120 on the positive electrode side has the basic configuration similar to that of the lower insulating member 130 on the negative electrode side described below, the lower insulating member 120 differs from the lower insulating member 130 in that the lower insulating member 120 includes the through-hole 121. Therefore, the positive electrode current collector 140 is notched in a portion facing the through-hole 121. Similarly, the positive electrode leading plate 145 is notched in a portion facing the through-hole 121. Therefore, the electrolyte solution flows smoothly from the electrolyte solution filling port 117 to the electrode body 400 through the through-hole 121. The basic configuration except for the notch of the positive electrode current collector 140 is identical to that of the negative electrode current collector 150 except for the notch. Similarly to the negative electrode leading plate 155, the positive electrode leading plate 145 is a conductive member, and the basic configuration except for the notch of the positive electrode leading plate 145 is identical to that of the negative electrode leading plate 155.

As illustrated in FIGS. 4 and 5, the lower insulating member 130 includes an accommodation unit 131 that accommodates the negative electrode current collector 150. The accommodation unit 131 has a recessed shape slightly larger than the external shape of the negative electrode current collector 150 such that the negative electrode current collector 150 can be accommodated. A through-hole 130a communicating with a through-hole 150a of the negative electrode current collector 150 is made in one end portion of the accommodation unit 131. A diameter of the through-hole 130a of the accommodation unit 131 is larger than that of a through-hole 150a of the negative electrode current collector 150. A fastening unit 310 of the negative electrode terminal 300 is inserted in the through-holes 130a and 150a.

At this point, in the accommodation unit 131, an area around the through-hole 130a is set to a tightening area 133. In the lower insulating member 130, the attaching unit 132 in which the latch 510 of the upper spacer 500 is latched is provided outside the tightening area 133.

In the accommodation unit 131, an area except for the tightening area 133, namely, an area on a negative side of the tightening area 133 in the X-axis direction is set to a welding area 134. In the negative electrode current collector 150, the negative electrode leading plate 155 of the welding target member is welded and fixed to a portion disposed in the welding area 134. Therefore, the negative electrode current collector 150 accommodated in the accommodation unit 131 is sandwiched between the lower insulating member 130 and the negative electrode leading plate 155.

In the welding area 134 of the accommodation unit 131, three protrusions 136 are arrayed at predetermined intervals in the X-axis direction. It is only necessary to provide at least one protrusion 136. The protrusion 136 is an elongated rib, which extends in the Y-axis direction so as to cover a total width of the accommodation unit 131. Thus, the plural protrusions 136 are disposed at predetermined intervals in the direction intersecting a lengthwise direction of the protrusion 136.

Because the negative electrode current collector 150 is in contact with leading surfaces of the plural protrusions 136, the negative electrode current collector 150 is held by the plural protrusions 136. Between the plural protrusions 136, the negative electrode current collector 150 separates from the lower insulating member 130 (see FIG. 10).

As illustrated in FIGS. 4 and 5, a projection 137 projecting outward is provided in a part of a rim portion of the lower insulating member 130. The projection 137 is disposed opposite the welding area 134 of the accommodation unit 131. The projection 137 is elongated in the X-axis direction, and an outer surface of the projection 137 constitutes an inclined surface.

Two projections 138 used in the positioning of the negative electrode leading plate 155 are provided between the accommodation unit 131 and the projection 137 in the lower insulating member 130 while separating from each other in the X-axis direction. Specifically, the projection 138 extends along the Y-axis direction from an outer edge of the welding area 134 of the accommodation unit 131 to the projection 137. It is only necessary to provide at least one projection 138.

Figure 6:
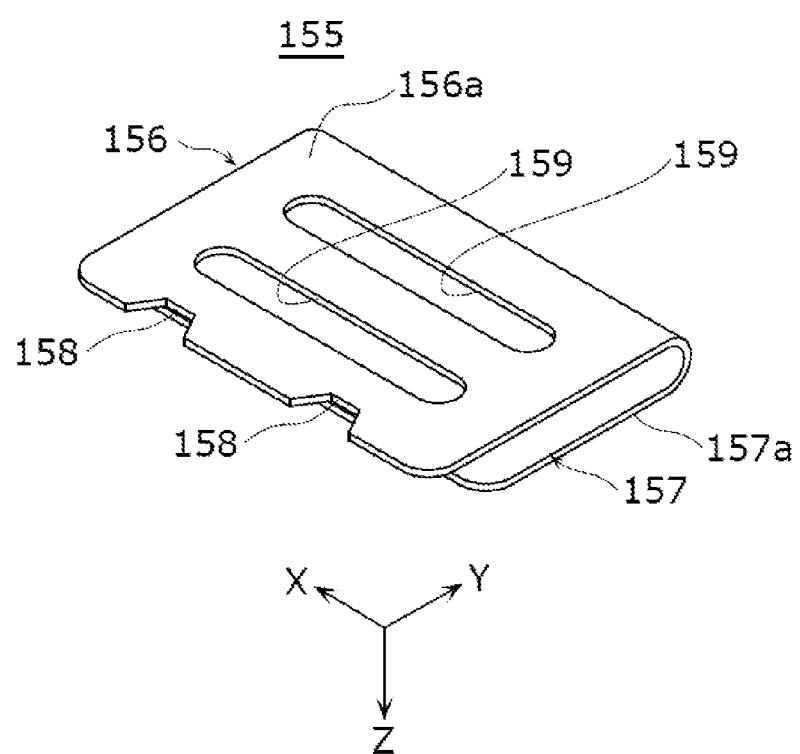
FIG. 6 is a perspective view illustrating a schematic configuration of a negative electrode leading plate of the embodiment.

FIG. 6 is a perspective view illustrating a schematic configuration of the negative electrode leading plate 155 of the embodiment.

As illustrated in FIG. 6, the negative electrode leading plate 155 is a sheet metal having a U-shape in a side view. Specifically, the negative electrode leading plate 155 includes a first plate 156 and a second plate 157, which face each other with a predetermined space, and end portions of the first plate 156 and second plate 157 are continuously connected to each other. The first plate 156 and the second plate 157 may be in contact with each other as long as the first plate 156 and the second plate 157 face each other. In the first plate 156, the negative electrode current collector 150 is fixed to a first principal surface 156a on the opposite side to the second plate 157. In the second plate 157, the tab 420 of the electrode body 400 is fixed to a second principal surface 157a on the opposite side to the first plate 156.

In the first plate 156, a pair of long through-holes (long holes 159) elongated in the X-axis direction is made in the Y-axis direction with a predetermined space. The negative electrode leading plate 155 and the negative electrode current collector 150 are welded to each other through a long hole 159. After the welding, a welded portion 190 is formed based on the long hole 159 (see FIG. 9).

As illustrated in FIG. 6, in a leading end portion of the first plate 156, two notches 158 are formed with a predetermined space in the X-axis direction. The notch 158 has a shape that gradually expands outward. In the embodiment, the notch 158 is formed into a trapezoidal shape in a plan view, and a lower bottom portion of the notch 158 is located at a leading end of the first plate 156. The two notches 158 engage the projections 138 of the lower insulating member 130. That is, the notch 158 is an engaging unit, and the projection 138 is an engaged unit. When the notches 158 engage the projections 138, the negative electrode leading plate 155 is positioned with respect to the lower insulating member 130 and the negative electrode current collector 150.

As illustrated in FIGS. 1 to 3, the positive electrode terminal 200 is electrically connected to the positive electrode of the electrode body 400 through the positive electrode current collector 140. The negative electrode terminal 300 is electrically connected to the negative electrode of the electrode body 400 through the negative electrode current collector 150. That is, the positive electrode terminal 200 and the negative electrode terminal 300 are a metallic electrode terminal used to introduce electricity stored in the electrode body 400 to an outer space of the energy storage device 10, or to introduce the electricity to an inner space of the energy storage device 10 in order to store the electricity in the electrode body 400. The positive electrode terminal 200 and the negative electrode terminal 300 are made of aluminum or aluminum alloy.

A fastening unit 210 is provided in the positive electrode terminal 200 in order to fasten the container 100 and the positive electrode current collector 140 to each other. A fastening unit 310 is provided in the negative electrode terminal 300 in order to fasten the container 100 and the negative electrode current collector 150 to each other.

The fastening unit 210 is a member (rivet) extending downward from the positive electrode terminal 200, and the fastening unit 210 is inserted and caulked in a through-hole 140a of the positive electrode current collector 140. Specifically, the fastening unit 210 is inserted and caulked in a through-hole 125a of the upper insulating member 125, the through-hole 110a of the cover plate 110, a through-hole 120a of the lower insulating member 120, and a through-hole 140a of the positive electrode current collector 140. Therefore, the positive electrode terminal 200 and the positive electrode current collector 140 are electrically connected to each other, and the positive electrode current collector 140 is fixed to the cover plate 110 together with the positive electrode terminal 200, the upper insulating member 125, and the lower insulating member 120.

The fastening unit 310 is a member (rivet) extending downward from the negative electrode terminal 300, and the fastening unit 310 is inserted and caulked in the through-hole 150a of the negative electrode current collector 150. Specifically, the fastening unit 310 is inserted and caulked in a through-hole 135a of the upper insulating member 135, the through-hole 110b of the cover plate 110, the through-hole 130a of the lower insulating member 130, and the through-hole 150a of the negative electrode current collector 150. Therefore, the negative electrode terminal 300 and the negative electrode current collector 150 are electrically connected to each other, and the negative electrode current collector 150 is fixed to the cover plate 110 together with the negative electrode terminal 300, the upper insulating member 135, and the lower insulating member 130.

The fastening unit 210 may be formed integrally with the positive electrode terminal 200, or the fastening unit 210 that is prepared separately from the positive electrode terminal 200 may be fixed to the positive electrode terminal 200 by a technique such as caulking and welding. The same holds true for a relationship between the fastening unit 310 and the negative electrode terminal 300.

The positive electrode current collector 140 is disposed between the electrode body 400 and the container 100 to electrically connect the electrode body 400 and the positive electrode terminal 200. The positive electrode current collector 140 is made of aluminum or aluminum alloy. In the embodiment, the positive electrode current collector 140 is electrically connected to the tab 410 on the positive electrode side of the electrode body 400 through the positive electrode leading plate 145 of the leading plate. Similarly to the positive electrode current collector 140, the positive electrode leading plate 145 is made of aluminum or aluminum alloy.

The negative electrode current collector 150 is disposed between the electrode body 400 and the container 100 to electrically connect the electrode body 400 and the negative electrode terminal 300. The negative electrode current collector 150 is made of copper or copper alloy. In the embodiment, the negative electrode current collector 150 is electrically connected to the tab 420 on the negative electrode side of the electrode body 400 through the negative electrode leading plate 155 of the leading plate. Similarly to the negative electrode current collector 150, the negative electrode leading plate 155 is made of copper or copper alloy.

A connection portion of the current collector and the tab with the leading plate interposed therebetween is described in detail later with reference to FIG. 8.

A configuration of the electrode body 400 will be described below with reference to FIG. 7.

Figure 7:
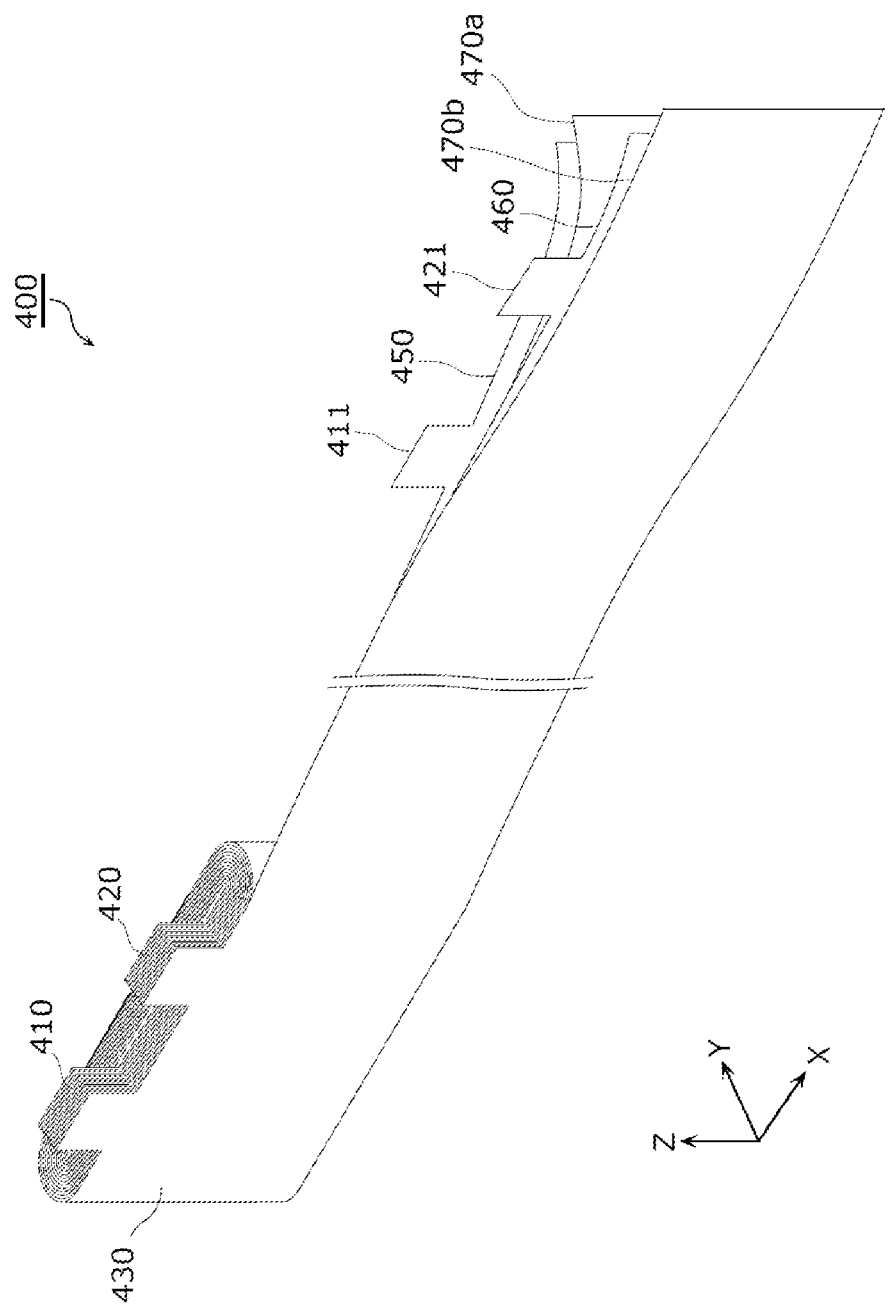
FIG. 7 is a perspective view illustrating a configuration of an electrode body of the embodiment.

FIG. 7 is a perspective view illustrating the configuration of the electrode body 400 of the embodiment. In FIG. 7, a winding state of the electrode body 400 is illustrated while partially developed.

The electrode body 400 is a power generation component in which the electricity can be stored. The electrode body 400 is formed by alternately laminating and winding a positive electrodes 450 and a negative electrode 460 and separators 470a and 470b. That is, the positive electrode 450, the separator 470a, the negative electrode 460 and the separator 470b are laminated in this order, and wound such that sections of the positive electrode 450, the separator 470a, the negative electrode 460 and the separator 470b are formed into an oval shape, thereby forming the electrode body 400.

The positive electrode 450 is an electrode plate in which a positive active material layer is formed on a surface of a positive electrode substrate layer of an elongated belt-like metallic foil made of aluminum or aluminum alloy. Any well-known material can properly be used as the positive active material for the positive active material layer as long as the material can occlude and emit lithium ions. For example, polyanion compounds such as $LiMPO_4$, $LiMSiO_4$, and $LiMBO_3$ (M is one or at least two kinds of transition metals selected from Fe, Ni, Mn, Co, and the like), spinel compounds such as lithium titanate and lithium manganate, and lithium transition metal oxides such as $LiMO_2$ (M is one or at least two kinds of transition metals selected from Fe, Ni, Mn, Co, and the like) can be used as the positive active material.

The negative electrode 460 is an electrode plate in which a negative active material layer is formed on a surface of a negative electrode substrate layer of an elongated belt-like metallic foil made of copper or copper alloy. Any well-known material can properly be used as the negative active material for the negative active material layer as long as the material can occlude and emit lithium ions. Examples of the negative active materials include lithium metal, lithium alloy (lithium metal-containing alloys such as lithium-aluminum, lithium-lead, lithium-tin, lithium-aluminum-tin, lithium-gallium, and Wood's metal), alloys that can occlude and emit lithium, carbon materials (such as graphite, non-graphitizing carbon, graphitizing carbon, low-temperature sintered carbon, and amorphous carbon), metal oxides, lithium metal oxides (such as $Li_4Ti_5O_{12}$), and polyphosphoric acid compounds.

The separators 470a and 470b are microporous sheet made of resin. Any well-known material can properly be used as the material for the separators 470a and 470b used in the energy storage device 10 as long as the material does not degrade performance of the energy storage device 10.

The positive electrode 450 includes plural projections 411 that project outward at one end in a winding axis direction. Similarly, the negative electrode 460 includes plural projections 421 that project outward at one end in the winding axis direction. The plural projections 411 and the plural projections 421 are a portion (active material uncoated portion) in which the substrate layer is exposed while not coated with the active material.

As used herein, the winding axis means a virtual axis that becomes a center axis about which the positive electrode 450 and the negative electrode 460 are wound. In the embodiment, the winding axis is a straight line passing through the center of the electrode body 400 in parallel to the Z-axis direction.

The plural projections 411 and the plural projections 421 are disposed at the end (the end on the positive side of the Z-axis direction in FIG. 4) on the identical side in the winding axis direction, and the positive electrode 450 and the negative electrode 460 are laminated, thereby laminating the plural projections 411 and the plural projections 421 at predetermined positions of the electrode body 400. Specifically, the positive electrode 450 is wound and laminated to laminate the plural projections 411 at the predetermined position in a circumferential direction at one end in the winding axis direction. The negative electrode 460 is wound and laminated to laminate the plural projections 421 at the predetermined position different from the position where the plural projections 411 are laminated in the circumferential direction at one end in the winding axis direction.

Resultantly, the tab 410 formed by laminating the plural projections 411 and the tab 420 formed by laminating the plural projections 421 are formed in the electrode body 400. For example, the tab 410 is collected toward the center in the laminating direction, and joined to the positive electrode leading plate 145 by ultrasonic welding. For example, the tab 420 is collected toward the center in the laminating direction, and joined to the negative electrode leading plate 155 by ultrasonic welding. The positive electrode leading plate 145 joined to the tab 410 is joined to the positive electrode current collector 140, and the negative electrode leading plate 155 joined to the tab 420 is joined to the negative electrode current collector 150.

The tab (410 and 420) introduces and leads out the electricity in the electrode body 400, and sometimes other names such as "lead" and a "current collector" are given to the tab.

The tab 410 does not contribute power generation because the tab 410 is formed by laminating the projection 411 of the portion in which the base material layer is exposed. Similarly, the tab 420 does not contribute the power generation because the tab 420 is formed by laminating the projection 421 of the portion in which the substrate layer is exposed. On the other hand, in the electrode body 400, a portion other than the tabs 410 and 420 contributes the power generation because the portion is formed by laminating the portion in which the active material is coated with the substrate layer. Hereinafter, the portion different from the tabs 410 and 420 is referred to as a body portion 430.

A configuration example of the connection portion of the current collector and the tab with the leading plate interposed therebetween will be described below with reference to FIG. 8.

Figure 8:
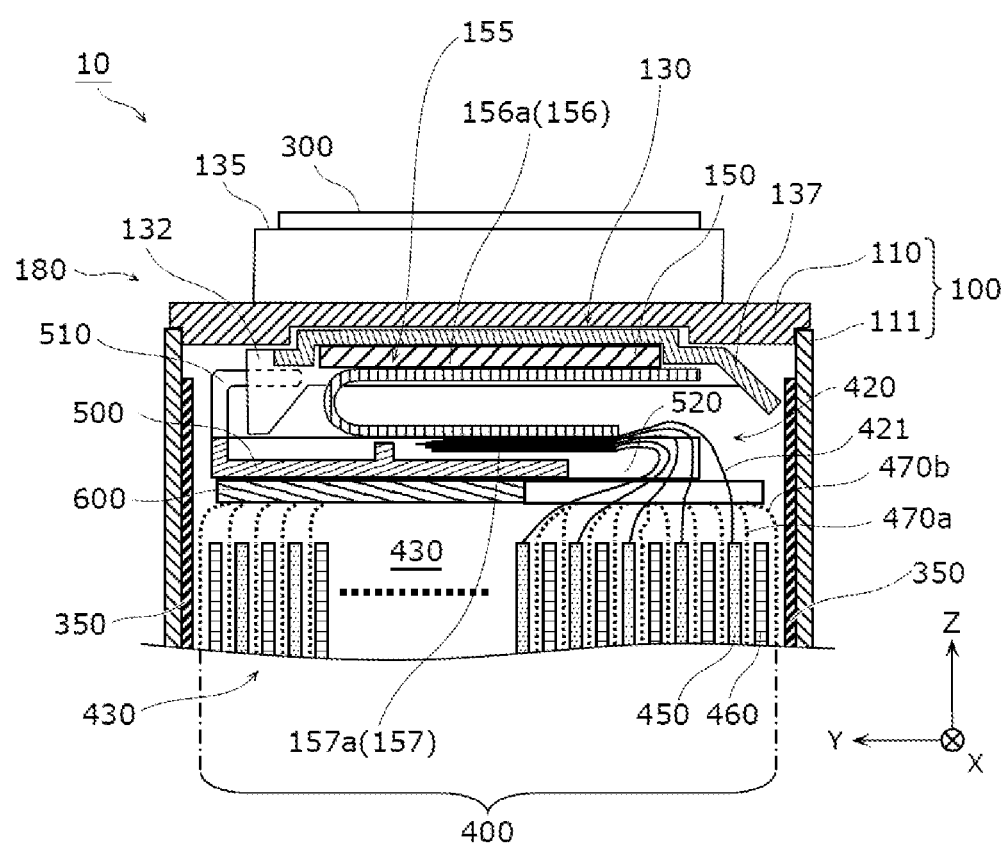
FIG. 8 is a sectional schematic diagram illustrating a negative electrode leading plate of the embodiment and a surrounding structure thereof.

FIG. 8 is a sectional schematic diagram illustrating the negative electrode leading plate 155 of the embodiment and a surrounding structure thereof. FIG. 8 illustrates a partial section of the energy storage device 10 when the energy storage device 10 is cut by a YZ-plane passing through a line VIII-VIII in FIG. 3, and the side spacer 700 (see FIG. 2) on the positive side in the X-axis direction is omitted in FIG. 8. The electrode body 400 is simplified and illustrated.

As illustrated in FIG. 8, the tab 420 of the electrode body 400 and the negative electrode current collector 150 are electrically connected to each other through the negative electrode leading plate 155. Specifically, the exposed surface of the negative electrode current collector 150 accommodated in the lower insulating member 130 is fixed to the first principal surface 156a of the first plate 156 of the negative electrode leading plate 155 while placed on the first principal surface 156a. The tab 420 of the electrode body 400 is fixed to the second principal surface 157a of the second plate 157 of the negative electrode leading plate 155 while placed on the second principal surface 157a.

The negative electrode leading plate 155 is disposed such that the second principal surface 157a of the second plate 157 faces an end portion on the side, on which the tab 420 is provided, of the body portion 430 of the electrode body 400. Therefore, the first plate 156 and second plate 157 of the negative electrode leading plate 155 overlap the end portion of the body portion 430.

The upper spacer 500 is disposed between the end portion on the side, on which the tab 420 is provided, of the body portion 430 and the cover plate 110. More particularly, the joined portion of the tab 420 and the negative electrode leading plate 155 is partitioned from the body portion 430 of the electrode body 400 by the upper spacer 500. The tab 420 is disposed while inserted in the insertion portion 520 provided in the upper spacer 500. As illustrated in FIG. 8, the buffer sheet 600 is sandwiched between the upper spacer 500 and the body portion 430 of the electrode body 400.

The projection 137 of the lower insulating member 130 is disposed between the end portion of the insulating sheet 350 and the tab 420. Specifically, a gap is formed between the end portion of the insulating sheet 350 and the cover plate 110. The projection 137 projects outward from the gap toward the side of the insulating sheet 350. The projection 137 is inclined outward so as to come close to the end portion of the insulating sheet 350. The leading end of the projection 137 separates from the insulating sheet 350. The projection 137 is disposed while facing a lateral side of the tab 420. A length in the X-axis direction of the projection 137 is longer than a length in the X-axis direction of the tab 420. Therefore, the whole tab 420 is covered with the projection 137.

The structure around the negative electrode leading plate 155 is illustrated and described in FIG. 8, and the structure around the positive electrode leading plate 145 is also similar. That is, the tab 410 of the electrode body 400 and the positive electrode current collector 140 are electrically connected to each other through the positive electrode leading plate 145 (for example, see FIG. 2) having a U-shape section. The joined portion of the tab 410 and the positive electrode leading plate 145 is partitioned from the body portion 430 of the electrode body 400 by the upper spacer 500, and the tab 410 is disposed while inserted in the insertion portion 520 provided in the upper spacer 500.

The electrode body 400 and the positive electrode current collector 140 are connected to each other through the positive electrode leading plate 145, and the electrode body 400 and the negative electrode current collector 150 are connected to each other through the negative electrode leading plate 155, which allows the lengths (the lengths in the winding axis direction (Z-axis direction)) of the tabs 410 and 420 of the electrode body 400 to be relatively shortened.

That is, the widths (the lengths in the winding axis direction (Z-axis direction)) of the electrode plates necessary for the production of the electrode body 400 can relatively be shortened in the positive electrode 450 and the negative electrode 460. This has an advantage from the viewpoint of production efficiency of the electrode body 400.

A method for producing the energy storage device 10 will be described below. In the following description, the negative electrode side is also illustrated, and the positive electrode side is omitted.

Figure 9:
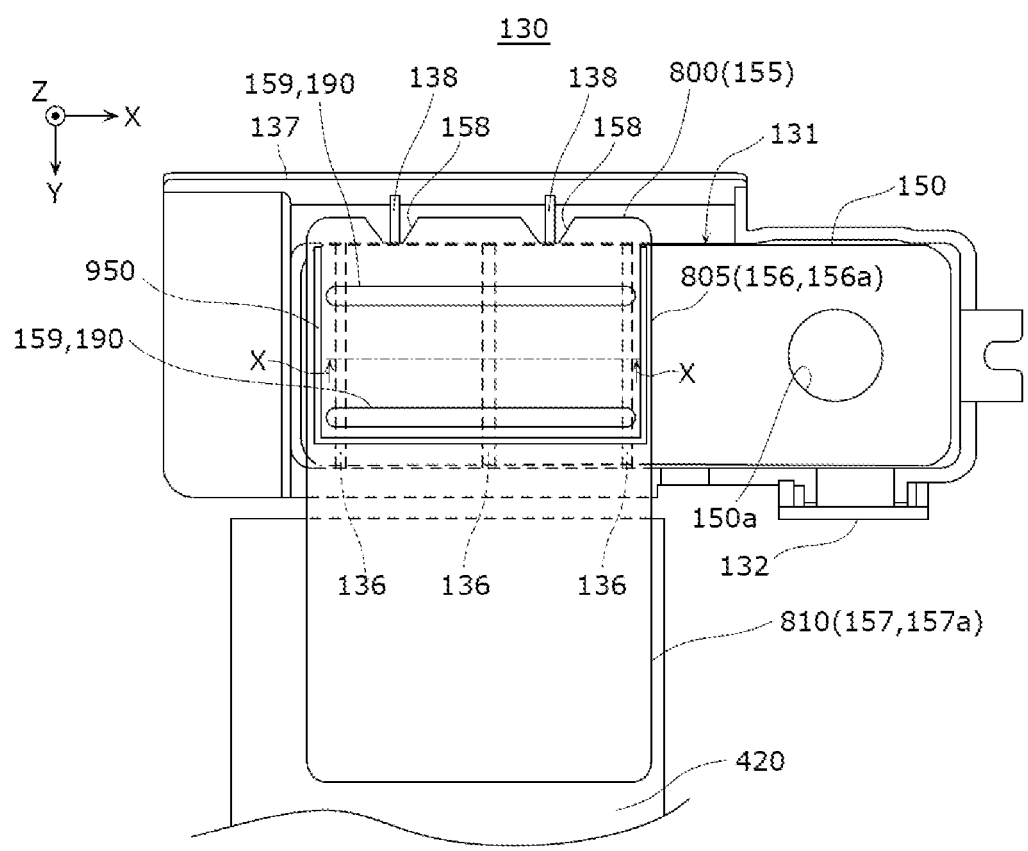
FIG. 9 is an explanatory view illustrating one process during production of the energy storage device of the embodiment.

FIG. 9 is an explanatory view illustrating one process during the production of the energy storage device 10 of the embodiment. Referring to FIG. 9, the lower insulating member 130 is disposed such that the accommodation unit 131 of the lower insulating member 130 is oriented upward (the positive side in the X-axis direction). This is because the welding is easily performed. However, during the welding, the lower insulating member 130 may be disposed in any way as long as the welding can be performed.

A flat plate 800 constituting the negative electrode leading plate 155 is prepared. The flat plate 800 includes a first area 805 and a second area 810, which are disposed on the identical flat surface. The first area 805 constitutes the first principal surface 156a of the first plate 156, and the second area 810 constitutes the second principal surface 157a of the second plate 157.

The tab 420 of the electrode body 400 is welded and fixed to the second area 810 of the flat plate 800 by ultrasonic welding.

On the other hand, the negative electrode current collector 150 is assembled in the lower insulating member 130 while accommodated in the accommodation unit 131.

Then, the flat plate 800 constituting the negative electrode leading plate 155 is placed on the exposed surface of the negative electrode current collector 150. At this point, the notch 158 is engaged with the projection 138 of the lower insulating member 130 while the flat plate 800 is slid on the exposed surface of the negative electrode current collector 150, and the negative electrode current collector 150 and the flat plate 800 are aligned with each other. During the alignment, because the notch 158 has the shape gradually spreading outward, the projection 138 can be guided to a desired position in the notch 158 when the projection 138 is slid along an edge portion of the notch 158.

Figure 10:
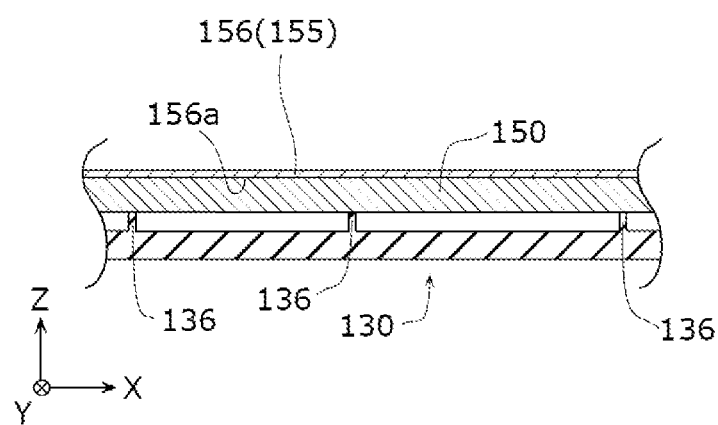
FIG. 10 is a sectional view illustrating the lower insulating member, a negative electrode current collector, and a flat plate when the lower insulating member, the negative electrode current collector, and the flat plate are cut by a ZX-plane passing through a line X-X in FIG. 9.

FIG. 10 is a sectional view illustrating the lower insulating member 130, the negative electrode current collector 150, and the plate 800 when the lower insulating member 130, the negative electrode current collector 150, and the flat plate 800 are cut by a ZX-plane passing through a line X-X in FIG. 9.

As illustrated in FIG. 10, after the alignment, leading end surfaces of the plural protrusions 136 of the lower insulating member 130 are in contact with the negative electrode current collector 150. In the plural protrusions 136, a space is formed between the negative electrode current collector 150 and the lower insulating member 130. The flat plate 800 is placed on the negative electrode current collector 150 supported by the plural protrusions 136. Therefore, the negative electrode current collector 150 abutting on the lower insulating member 130 is sandwiched between the lower insulating member 130 and the flat plate 800. At this point, the extending direction of the long hole 159 of the plate 800 is orthogonal to the lengthwise direction of the protrusion 136 (see FIG. 9). The flat plate 800 and the negative electrode current collector 150 are welded to each other at this point.

Energy beam welding in which the energy beam is emitted is used to weld the flat plate 800 to the negative electrode current collector 150. Electron beam welding and laser welding can be cited as an example of the energy beam welding. The laser welding is adopted in the embodiment.

During the laser welding, a jig 950 having a U-shape in a plan view is provided while abutting on the flat plate 800 as illustrated in FIG. 9. The jig 950 is opened on the side of the notch 158 while surrounding the long hole 159. The laser welding is performed while shielding gas such as argon, helium, and nitrogen is injected from the opened portion of the jig 950.

During the laser welding, the laser is emitted such that the peripheral edge portion of the long hole 159 of the flat plate 800 is fillet-welded to the negative electrode current collector 150. Therefore, a laser proceeding direction becomes parallel to the extending direction of the long hole 159, namely, the direction orthogonal to the lengthwise direction of the protrusion 136. After the welding, the peripheral edge portion of the long hole 159 or an inside area of the long hole 159 including the peripheral edge portion constitutes the welded portion 190. Accordingly, the three protrusions 136 of the lower insulating member 130 face the welded portion 190 with the negative electrode current collector 150 interposed therebetween.

During the laser welding, the heat transfers to the protrusion 136 of the lower insulating member 130 through the negative electrode current collector 150. Therefore, the protrusion 136 is melted. After the welding, the protrusion 136 is welded to the negative electrode current collector 150.

After the flat plate 800 is welded to the negative electrode current collector 150, the flat plate 800 is subjected to bending to form the negative electrode leading plate 155.

FIGS. 11 to 15 are explanatory views illustrating each process in the bending of the flat plate 800 of the embodiment.

In advance of the bending, other components of the cover plate structure 180 are assembled in the lower insulating member 130 to assemble the cover plate structure 180.

Figure 11:
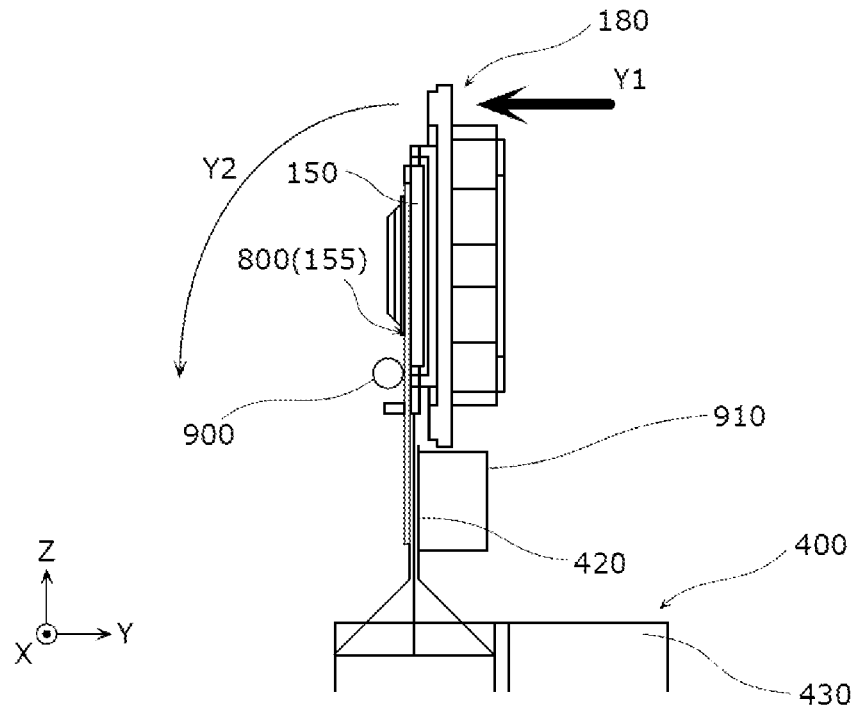
FIG. 11 is an explanatory view illustrating each process in bending of the flat plate of the embodiment.

As illustrated in FIG. 11, a cylindrical jig 900 is abutted on a bent portion of the flat plate 800. A rectangular prism-shaped jig 910 is disposed at a position where the tab 420 fixed to the flat plate 800 is sandwiched between the jig 910 and the flat plate 800. Specifically, the tab 420 is sandwiched between one flat surface of the jig 910 and the flat plate 800. The tab 429 is sandwiched between the jig 910 and the flat plate 800 in a surface contact manner, so that the tab 420 can be protected. At this point, force in a direction of an arrow Y1 in FIG. 11 is provided to the cover plate structure 180 to move the cover plate structure 180 in a direction of an arrow Y2. Therefore, the plate 800 is bent along an outer circumferential surface of the jig 900.

Figure 12:
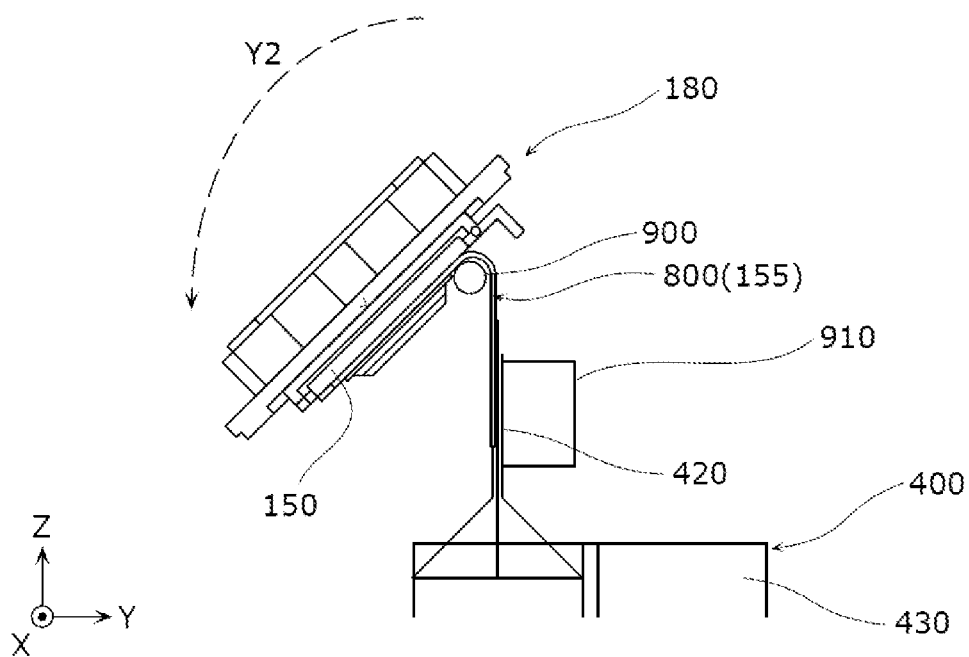
FIG. 12 is an explanatory view illustrating each process in the bending of the flat plate of the embodiment.

As illustrated in FIG. 12, when the plate 800 is bent up to a predetermined angle, the jigs 900 and 910 are withdrawn from the positions. Because the jig 900 is disposed on the opposite side to the tab 420 with respect to the flat plate 800, the jig 900 does not come into contact with and damage the tab 420 during the withdrawal.

Figure 13:
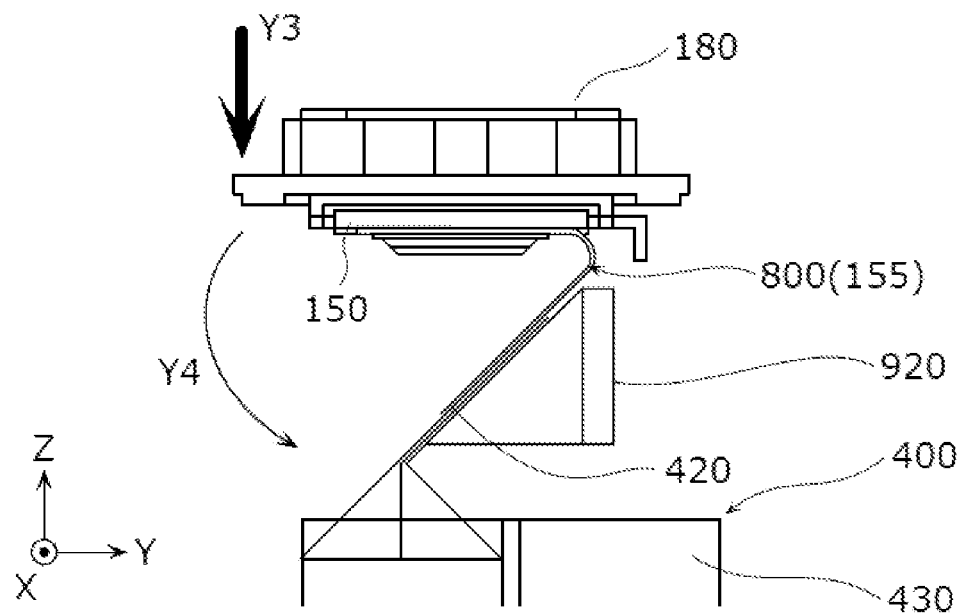
FIG. 13 is an explanatory view illustrating each process in the bending of the flat plate of the embodiment.
Figure 14:
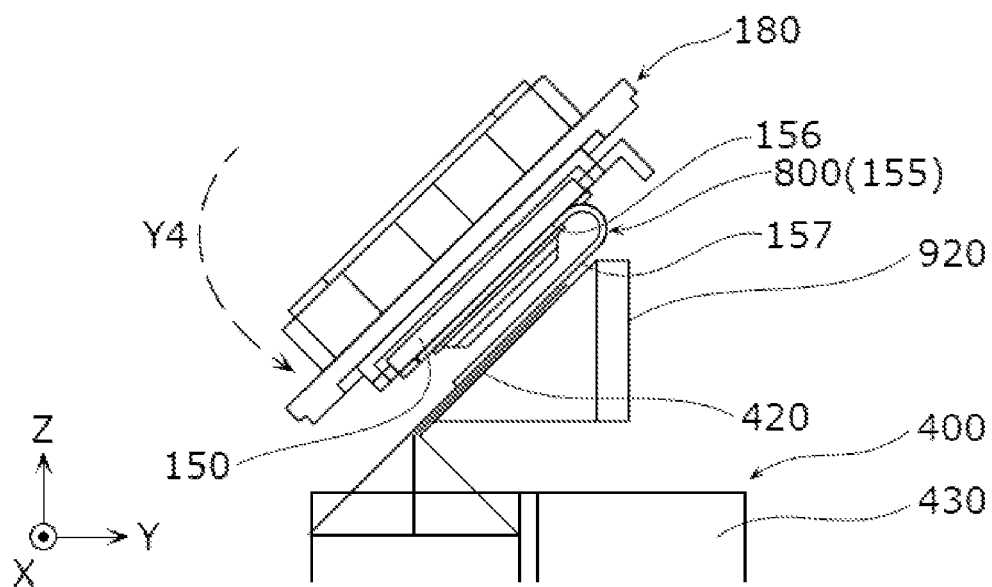
FIG. 14 is an explanatory view illustrating each process in the bending of the flat plate of the embodiment.
Figure 15:
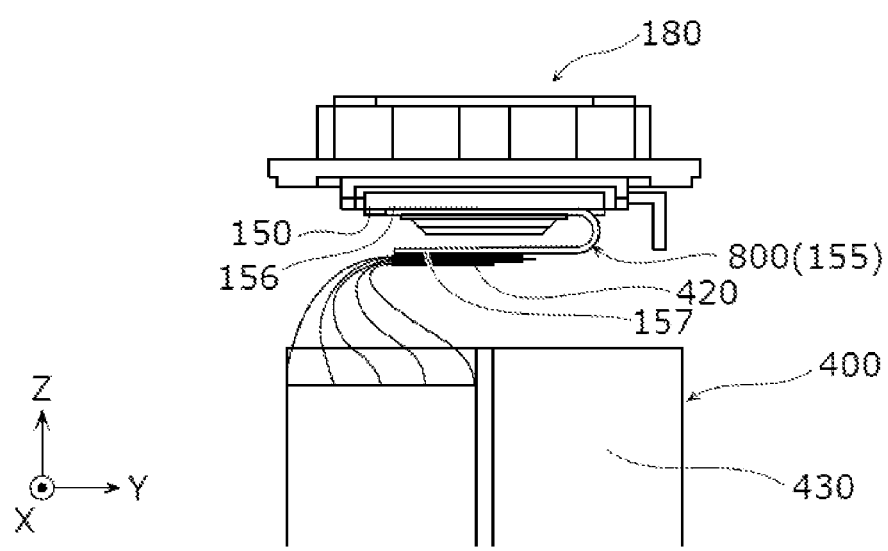
FIG. 15 is an explanatory view illustrating each process in the bending of the flat plate of the embodiment.

Then a prism-shaped jig 920 is placed as illustrated in FIG. 13. The jig 920 is disposed such that the tab 420 fixed to the flat plate 800 is sandwiched between an inclined surface of the jig 920 and the flat plate 800. At this point, force in a direction of an arrow Y3 in FIG. 13 is provided to the cover plate structure 180 to move the cover plate structure 180 in a direction of an arrow Y4. As illustrated in FIG. 14, the negative electrode leading plate 155 is formed when the first plate 156 and second plate 157 of the flat plate 800 face each other with a predetermined space. Then, the jig 920 is withdrawn from the position, and the negative electrode leading plate 155 is disposed such that the second principal surface 157a of the second plate 157 faces an end portion on the side, on which the tab 420 is provided, of the body portion 430 of the electrode body 400 as illustrated in FIG. 15.

Then, the electrode body 400, the cover plate structure 180, the upper spacer 500, the buffer sheet 600, the insulating sheet 350, and the like are accommodated in the main body 111 of the container 100, and the cover plate 110 is welded to the main body 111 to assemble the container 100.

After the electrolyte solution is poured from the electrolyte solution filling port 117, the electrolyte solution filling plug 118 is welded to the cover plate 110 to close the electrolyte solution filling port 117, thereby producing the energy storage device 10.

As described above, in the embodiment, the first plate 156 and second plate 157 of the negative electrode leading plate 155 face each other, and the tab 420 is fixed to the second principal surface 157a of the second plate 157. That is, because the tab 420 is fixed to the second principal surface 157a constituting the outer peripheral surface of the negative electrode leading plate 155, the tab 420 hardly interferes with the leading end portion of the negative electrode leading plate 155. Accordingly, the breakage of the tab 420 can be suppressed.

When the breakage of the tab 420 is suppressed, it is not necessary to bend the plural tabs 420 into an R-shape, but the accommodation space of the tab 420 can be reduced. Accordingly, enlargement of the energy storage device 10 can be suppressed.

Because the second principal surface 157a of the second plate 157 of the negative electrode leading plate 155 faces the end portion from which the tab 420 of the body portion 430 of the electrode body 400 projects, the second plate 157 and the first plate 156 overlap the end portion of the body portion 430. Accordingly, accommodation space for the negative electrode leading plate 155 can be reduced.

Because the upper spacer 500 is provided between the tab 420 and the body portion 430, the upper spacer 500 presses the tab 420 even if the tab 420 is broken, and the tab 420 can be prevented from coming into contact with other conductive members. The tab 420 is reinforced by the upper spacer 500 by bringing the upper spacer 500 into contact with the tab 420, and the strength of the tab 420 can be enhanced.

After the negative electrode current collector 150 and the tab 420 are fixed to the identical flat surface of the flat plate 800, the flat plate 800 is bent to constitute the negative electrode leading plate 155, so that the fixing can be performed more easily than the case that the fixing is performed on the originally-bent member. The negative electrode current collector 150 and the tab 420 are fixed to the flat plate 800, so that the stable fixing can be performed and the joining strength of the tab 420 can be enhanced. Accordingly, breakage of the tab 420 can be suppressed.

Because the protrusion 136 of the lower insulating member 130 is in contact with the surface on the opposite side to the surface that is in contact with the negative electrode leading plate 155 of the negative electrode current collector 150, the lower insulating member 130 separates from the negative electrode current collector 150 in the portion in which the protrusion 136 does not exist. Accordingly, even if the negative electrode leading plate 155 is welded to the negative electrode current collector 150, because the heat of the welding transfers only to the protrusion 136, the thermal deformation of the lower insulating member 130 can be suppressed as a whole.

The protrusion 136 is melted by the heat during the welding, and the protrusion 136 is solidified and joined to the negative electrode current collector 150 after the welding, whereby the negative electrode current collector 150 and the lower insulating member 130 are integrated with each other. Therefore, the negative electrode current collector 150 can be prevented from separating from the lower insulating member 130 after the welding.

The negative electrode leading plate 155 and the negative electrode current collector 150 are welded to each other by the energy beam welding, so that the welding can be performed in a short time. Accordingly, a heat influence on the whole lower insulating member 130 can be decreased.

At this point, the heat largely affects the lower insulating member 130 because the negative electrode leading plate 155 is relatively thin. However, only the protrusion 136 is deformed even if the welding target member is the negative electrode leading plate 155, so that the whole lower insulating member 130 can be maintained at a small deformation amount.

Because the projection 137 of the lower insulating member 130 is disposed between the end portion of the insulating sheet 350 and the tab 420, the projection 137 presses the tab 420 to restrict the further movement of the tab 420 even if the tab 420 is cut due to a vibration or a shock. The post-cutting movement of the tab 420 is restricted to a range where the insulating sheet 350 exists, so that the contact between the tab 420 and the container 100 can be prevented.

The protrusion 136 is formed into the elongated shape along the direction intersecting the extending direction of the welded portion 190, the laser passes through the protrusion 136 in a short time during the welding, and the heat influence on the protrusion 136 can be suppressed.

Because the plural protrusions 136 are disposed at predetermined intervals in the direction intersecting the lengthwise direction, the negative electrode leading plate 155 is stably held by the plural protrusions 136, and the welding can stably be performed. A joined area between the protrusion 136 and the negative electrode leading plate 155 can be enlarged after the welding.

The welded portion 190 is formed by performing the fillet welding through the long hole 159. Therefore, compared with other kinds of welding, the welding can surely be performed while the heat influence on the lower insulating member 130 is suppressed. The shape of the through-hole is not limited to the long hole.

Because the engaged unit (projection 138) is provided in the lower insulating member 130 while the engaging unit (notch 158) is provided in the negative electrode leading plate 155, when the engaging unit is engaged with the engaged unit, the negative electrode current collector 150 abutting on the lower insulating member 130 and the negative electrode leading plate 155 can be aligned with each other. Accordingly, workability can be enhanced during the welding.

The engaged unit is the projection 138, and the engaging unit is the notch 158, so that the projection 138 can be engaged from the opening of the notch 158. Accordingly, the notch 158 can be engaged with the projection 138 by sliding the negative electrode leading plate 155 on the negative electrode current collector 150 abutting on the lower insulating member 130, and the alignment can be performed by simple work.

Because the notch 158 has the shape gradually spreading outward, the projection 138 can be guided to the desired position in the notch 158 when the projection 138 is slid along the edge portion of the notch 158. Accordingly, the positioning can more easily be performed.

The accommodation unit 131 in which the negative electrode current collector 150 is accommodated is provided in the lower insulating member 130, and the engaged unit (projection 138) is provided outside the accommodation unit 131, so that the alignment of the negative electrode leading plate 155 can be performed while the negative electrode current collector 150 is accommodated in the accommodation unit 131. Accordingly, the positioning can easily be performed.

OTHER EMBODIMENTS

The energy storage device of the invention is described above based on the embodiment. However, the present invention is not limited to the embodiment. Various modifications of the embodiment that are made by those skilled in the art or various configurations constructed by a combination of the plural components described above are also included in the present invention as long as the modifications and the configurations do not depart from the scope of the present invention.

For example, the number of electrode bodies 400 included in the energy storage device 10 is not limited to one, but at least two electrode bodies 400 may be provided. In the case that the energy storage device 10 includes the plural electrode bodies 400, a dead space can be reduced in a corner of the container 100 compared with the case that the single electrode body 400 is accommodated in the container 100 having the identical volume (capacity). A ratio of the electrode body 400 to the capacity of the container 100 can be increased, and therefore the capacity of the energy storage device 10 can be increased.

The electrode body 400 included in the energy storage device 10 is not always formed into the winding type. For example, the energy storage device 10 may include a laminated type electrode body in which plate-like electrode plates are laminated. For example, the energy storage device 10 may include an electrode body having a bellows-shaped laminated structure formed by repeating a mountain fold and a valley fold of an elongated belt-like electrode plate.

There is no particular limitation to a positional relationship between the positive electrode-side tab 410 and the negative electrode-side tab 420 in the electrode body 400. For example, in the winding type electrode body 400, the tabs 410 and 420 may be disposed on the opposite side to each other in the winding axis direction. In the case that the energy storage device 10 includes the laminated type electrode body, the positive electrode-side tab and the negative electrode-side tab may be provided while projecting in different directions, when the positive electrode-side tab and the negative electrode-side tab are viewed from the laminated direction. In this case, it is only necessary to dispose the lower insulating member, the leading plate, the current collector, and the like at positions corresponding to the positive electrode-side tab and the negative electrode-side tab.

In the configuration of the embodiment, by way of example, the protrusion 136 that is in contact with the negative electrode current collector 150 is provided in the lower insulating member 130 to suppress a contact area between the lower insulating member 130 and the negative electrode current collector 150. The similar configuration can be applied to the upper insulating members 125 and 135. Specifically, protrusions that are in contact with the terminals (the positive electrode terminal 200 and the negative electrode terminal 300) are provided in the upper insulating members 125 and 135 to suppress the contact area between the upper insulating members 125 and 135 and the terminals. Therefore, in welding the busbar to the terminal, only the protrusion can be melted to suppress the deformations of the whole upper insulating members 125 and 135. In this case, the busbar constitutes the welding target member.

In the embodiment, the elongated protrusion 136 is described by way of example. However, any shape of the protrusion may be used as long as a heat transfer amount to the main body of the lower insulating member 130 is suppressed while the protrusion is meltable in the welding. Like the protrusion 136 of the embodiment, when the protrusion 136 has the continuous shape with respect to the total width of the accommodation unit 131, the bend of the lower insulating member 130 can be suppressed during molding of the lower insulating member 130.

In the embodiment, by way of example, the tab 420 of the electrode body 400 and the negative electrode current collector 150 are welded to the negative electrode leading plate 155. Alternatively, as long as the conductivity is ensured among the tab 420, the negative electrode current collector 150, and the negative electrode leading plate 155, the tab 420 and the negative electrode current collector 150 may be fixed to the negative electrode leading plate 155 by other fixing methods other than the welding. Examples of the fixing methods include an adhesion technique in which a conductive adhesive is used or caulking technique.

In the embodiment, the negative electrode leading plate 155 having the U-shape in the side view is described by way of example. Alternatively, any shape of the leading plate may be used as long as the first plate and the second plate are integrally formed while facing each other.

Figure 16:
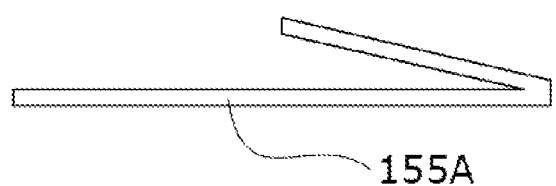
FIG. 16 is a side view schematically illustrating a leading plate according to a modification of the embodiment.
Figure 17:
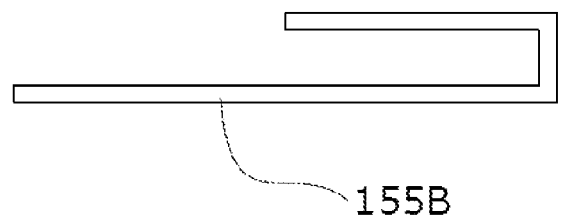
FIG. 17 is a side view schematically illustrating a leading plate according to a modification of the embodiment.

FIGS. 16 and 17 are side views schematically illustrating a leading plate according to a modification of the embodiment.

A leading plate 155A may be formed by bending the flat plate once as illustrated in FIG. 16. Alternatively, as illustrated in FIG. 17, when viewed in a side view, a leading plate 155B may be formed by bending the flat plate at a right angle at two portions.

Alternatively, a metallic plate or an insulating plate, which is provided separately from the leading plate, may be disposed between the first and second plates facing each other.

In the embodiment, by way of example, when viewed in a plan view, the notch 158 of the negative electrode leading plate 155 has the trapezoidal shape in which the lower bottom portion is located at the leading end of the first plate 156. The notch 158 may be formed into any shape as long as the notch 158 gradually expands outward. Two gradually spreading sides facing each other may be formed into a linear shape or a curved shape.

In the embodiment, by way of example, the engaging unit of the negative electrode leading plate 155 constitutes the notch 158, and the engaged unit of the lower insulating member 130 constitutes the projection 138. However, the engaging unit and the engaged unit may be formed into any shape as long as the engaging unit and the engaged unit can be engaged and aligned with each other. For example, the engaging unit of the negative electrode leading plate 155 may be formed as a hole while the engaged unit of the lower insulating member 130 is formed as a boss inserted in the hole.

It is noted that a configuration constructed by any combination of the embodiment and the modifications is also included in the present invention.

INDUSTRIAL APPLICABILITY

The present invention can be applied to energy storage devices such as a lithium ion secondary battery.

DESCRIPTION OF REFERENCE SIGNS 10 energy storage device
100 container
110 cover plate
110a,110b,120a,121,125,130a,135a,140a,150a through-hole
111 main body
112 opening 113 bottom
117 electrolyte solution filling port
118 electrolyte solution filling plug
120,130 lower insulating member (insulating member)
120b engagement projection
122,132 attaching unit
125,135 upper insulating member
131 accommodation unit
133 tightening area
134 welding area
136 protrusion
137 projection
138 projection
140 positive electrode current collector (current collector)
145 positive electrode leading plate (leading plate)
150 negative electrode current collector (current collector)
155 negative electrode leading plate (leading plate)
155A,155B leading plate
156 first plate
156a first principal surface
157 second plate
157a second principal surface
158 notch
159 long hole
160 swelling unit
170 safety valve
180 cover plate structure
190 welded portion
200 positive electrode terminal (terminal)
210 fastening unit
300 negative electrode terminal (terminal)
310 fastening unit
350 insulating sheet
400 electrode body
410,420 tab
411,421 projection
430 body portion
450 positive electrode
460 negative electrode
470a, 470b separator
500 upper spacer
510 latch
520 insertion portion
600 buffer sheet
700 side spacer
800 flat plate
805 first area
810 second area
900,910,920,950 jig

The invention claimed is:

1. An energy storage device, comprising:
a current collector of a positive electrode;
a current collector of a negative electrode;
an electrode body that includes a body portion, a tab of the positive electrode and a tab of the negative electrode, the tabs of the positive electrode and the negative electrode projecting from one end of the body portion;
a leading plate of the positive electrode; and
a leading plate of the negative electrode,
wherein the leading plate of the positive electrode connects the current collector of the positive electrode and the tab of the positive electrode,
wherein the leading plate of the negative electrode connects the current collector of the negative electrode and the tab of the negative electrode,
wherein, in each of the leading plates of the positive electrode and the negative electrode, first and second plates facing each other are connected at end portions thereof,
wherein, in the first plate, the current collector is fixed to a first surface on an opposite side to the second plate, and
wherein, in the second plate, the tab is fixed to a second surface on an opposite side to the first plate.

2. The energy storage device according to claim 1, wherein, in the leading plate of the negative electrode, the second surface of the second plate is disposed at a position facing an end portion of the body portion from which the tab of the negative electrode projects.

3. The energy storage device according to claim 1, wherein an insulating member is provided between the tab of the negative electrode and the body portion.

4. A method for producing an energy storage device including a current collector, an electrode body that includes a body portion and a tab projecting from the body portion, and a leading plate that includes first and second plates facing each other, the current collector being fixed to a first surface on an opposite side to the second plate in the first plate, the tab being fixed to a second surface on an opposite side to the first plate in the second plate, the method comprising:
placing a flat plate for forming the leading plate such that the flat plate extends parallel to a projecting direction of the tab from the body portion, and a first area of the flat plate and a second area of the flat plate are stacked along the projecting direction of the tab from the body portion;
fixing the tab to the second area of the flat plate, the flat plate including the first area and the second area on an identical flat surface, the first area constituting the first surface of the first plate, the second area constituting the second surface of the second plate;
fixing the current collector to the first area; and
forming the leading plate by bending an area of the flat plate between the first area and the second area.

5. The energy storage device according to claim 1, wherein, in said each of the leading plates of the positive electrode and the negative electrode, the first plate and the second plate are continuously connected at the end portions.

6. The energy storage device according to claim 1, wherein the tabs of the positive electrode and the negative electrode project from a same side of the body portion.

7. The energy storage device according to claim 1, wherein, in a stacking direction of the current collector of the negative electrode on the leading plate of the negative electrode, the tabs of the positive electrode and the negative electrode project from a same side the body portion.

8. The energy storage device according to claim 1, wherein the first and second plates are a unitary piece.

9. The energy storage device according to claim 1, wherein said each of the leading plates of the positive electrode and the negative electrode includes a single piece that forms the first and second plates.

10. The energy storage device according to claim 1, wherein said each of the leading plates of the positive electrode and the negative electrode includes a single piece that forms an entirety of the first and second plates.

11. The energy storage device according to claim 1, wherein the first surface includes an upper surface of the first plate.

12. The energy storage device according to claim 11, wherein the second surface includes a bottom surface of the second plate.

13. The energy storage device according to claim 1, wherein the second surface includes a bottom surface of the second plate.

14. The method according to claim 4, wherein the current collector contacts the first surface, and the tab contacts the second surface.

15. The method according to claim 4, wherein the current collector is in a direct contact with the first surface, and the tab is in a direct contact with the second surface.

16. The method according to claim 4, wherein the tab includes tabs of a positive electrode of the energy storage device and a negative electrode of the energy storage device, the tabs projecting from one end of the body portion.

17. The method according to claim 16, wherein, after the bending the area of the flat plate, in the projecting direction of the tab from the body portion, the tabs project from a same side of the body portion.

18. The method according to claim 4, wherein the first area and second area are a unitary piece of the flat plate.

19. The method according to claim 4, wherein, after the bending the area of the flat plate, in projecting direction of the tab from the body portion, the first surface includes an upper surface of the first plate.

20. The method according to claim 19, wherein, after the bending the area of the flat plate, in projecting direction of the tab from the body portion, the second surface includes a bottom surface of the second plate.

* * * * *